United States Patent [19]
Jean et al.

[11] Patent Number: 5,321,408
[45] Date of Patent: Jun. 14, 1994

[54] MICROWAVE APPARATUS AND METHOD FOR ULLAGE MEASUREMENT OF AGITATED FLUIDS BY SPECTRAL AVERAGING

[75] Inventors: Buford R. Jean, Round Rock; Gary L. Warren, Austin, both of Tex.

[73] Assignee: Baker Hughes Incorporated

[21] Appl. No.: 999,680

[22] Filed: Dec. 31, 1992

[51] Int. Cl.$^5$ .............................................. G01S 13/08
[52] U.S. Cl. ................... 342/124; 342/192; 342/196
[58] Field of Search ................ 342/124, 128, 192, 196

[56] References Cited

U.S. PATENT DOCUMENTS

| | | | |
|---|---|---|---|
| 4,044,355 | 8/1977 | Edvardsson | 342/124 |
| 4,425,793 | 1/1984 | Turton et al. | 342/124 X |
| 4,443,792 | 4/1984 | Pidgeon et al. | 342/124 |
| 4,458,530 | 7/1984 | Bastida . | |
| 4,620,192 | 10/1986 | Collins | 342/128 |
| 4,621,264 | 11/1986 | Yashiro et al. | 342/124 |
| 4,642,777 | 2/1987 | Schwanke | 342/109 X |
| 4,661,817 | 4/1987 | Bekkadal et al. | 342/124 |
| 4,665,403 | 5/1987 | Edvardsson | 342/124 |
| 4,737,791 | 4/1988 | Jean et al. | 342/124 |
| 4,744,040 | 5/1988 | Kawata et al. | 342/124 X |
| 4,766,436 | 8/1988 | Crepin et al. | 342/122 |
| 4,847,623 | 7/1989 | Jean et al. | 342/124 |
| 4,947,354 | 8/1990 | Hethuin | 342/122 X |
| 4,972,386 | 11/1990 | Lau | 342/124 X |
| 5,012,248 | 4/1991 | Munro et al. | 342/22 |
| 5,023,618 | 6/1991 | Reits | 342/128 |
| 5,072,223 | 12/1991 | Hethuin et al. | 342/122 |
| 5,134,411 | 7/1992 | Adler | 342/130 |
| 5,194,870 | 3/1993 | Pearce et al. | 342/128 |

*Primary Examiner*—John B. Sotomayor
*Attorney, Agent, or Firm*—Alton W. Payne

[57] ABSTRACT

A microwave apparatus and method for ullage measurement of agitated materials is provided. The apparatus and method utilize a transformation of the reflected time domain signal into a frequency domain signal. The frequency domain signal is averaged using the natural, inherent weighting associated with the transformation to achieve a unique corrected result. The average frequency domain signal is then used to calculate the average distance for determining the ullage measurement.

6 Claims, 5 Drawing Sheets

MICROWAVE APPARATUS AND METHOD FOR ULLAGE MEASUREMENT OF AGITATED FLUIDS BY SPECTRAL AVERAGING

FIELD OF THE INVENTION

The present invention relates generally to the measurement of materials in containers and specifically to the ullage measurement of agitated materials in containers.

BACKGROUND OF THE INVENTION

It is well known to use various mechanical, electrical and electro-mechanical devices to determine the level of material in a tank or container. Mechanical devices include floats, displacers, diaphragms or vibrating elements. Other devices use the specific gravity of the material in order to accurately determine the level of the material in the tank. Also, optical sensors are used as well as conductivity sensing devices. Lastly, microwave sensors have been used for detecting the level of solids or liquids. However, all of these devices are incapable of determining the median level of a fluid in a tank when the fluid is in a state of agitation. Devices are unable to make an accurate measurement when the uniformity of the surface of the fluid is randomly disturbed.

The disadvantages of the prior technology with respect to the agitation are overcome by the present invention, and improved methods and apparatus are hereinafter described for inexpensively and reliably determining the mean level of a fluid in a tank when the surface of the fluid is agitated. Typically, an expensive, sophisticated microwave transducer module, having a wide band width, is required to avoid the problems so elegantly solved by the present invention. With the aid of the present invention, almost any microwave transducer module can be used.

SUMMARY OF THE INVENTION

To achieve the foregoing features and advantages, and in accordance with the purposes of the invention as embodied and broadly described herein, a unique microwave apparatus and method for ullage measurement of agitated materials is provided. The method comprises emitting a microwave signal into a tank containing agitated fluid; receiving multiple time domain measurements of the emitted microwave signal; converting each of the time domain signals to frequency domain signals; taking repeated time domain measurements and converting the time domain measurements to frequency domain measurements; summing the resulting frequency domain measurements to obtain a total frequency domain spectrum; and determining the peak having the highest amplitude, which peak represents a frequency, and which frequency is directly related to the median distance to the surface of the agitated material in the tank. Preferably, a transformation is made of the time domain measurement to create the frequency domain measurement. Such a transformation is the fast Fourier transform.

A microwave apparatus for determining the ullage of agitated materials in a tank comprises a linear FM radar for transmitting a linear FM microwave signal into the agitated material and for receiving the reflected signals. An analog-to-digital converter for placing the signals into processing form. Computing means for applying a transform from time domain to frequency domain. Storage means for accepting the frequency domain material from the means for transforming. Means for computing the average using the frequency data in the storage means. And means for finding the maximum peak associated with the average calculated in the means for calculating. Calculating the difference frequency for determining the mean distance level or ullage of the agitated material in the tank.

BRIEF DESCRIPTION OF THE DRAWINGS

The accompanying drawings which are incorporated in and constitute a part of the specification, illustrate the preferred embodiments of the invention and, together with the general description of the invention given above and the detailed description of the preferred embodiments given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1:
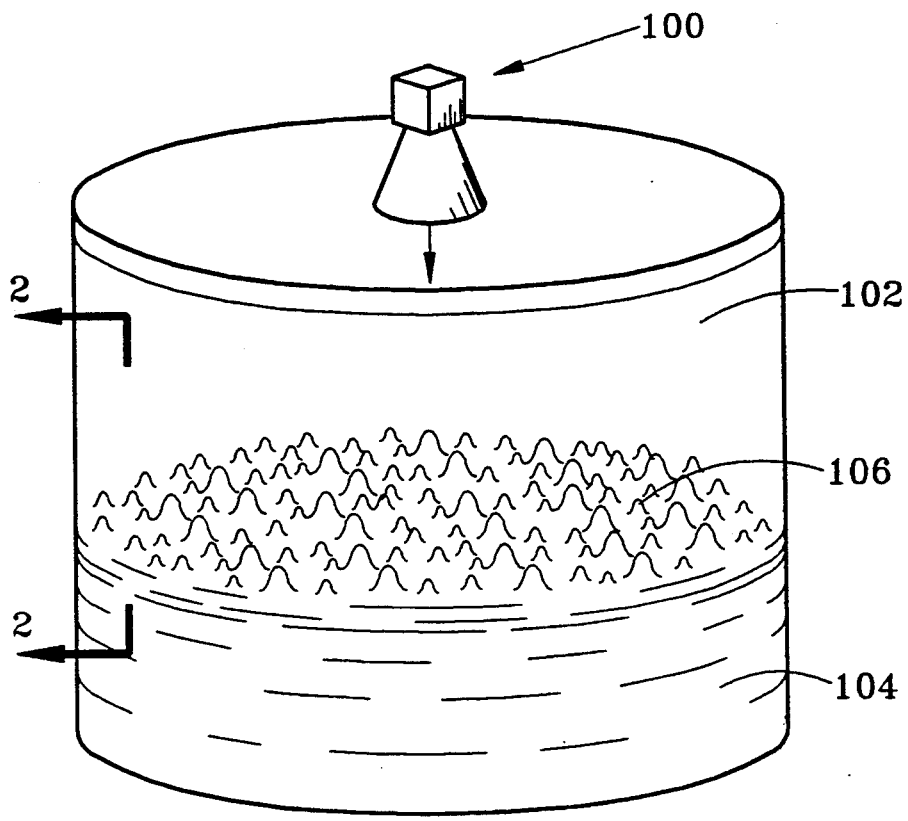
FIG. 1 is a perspective view illustrating the use of the present invention for measuring ullage of agitated materials in a tank.

FIG. 1 illustrates a tank 102 having a linear FM radar 100 attached. The tank 102 has a fluid 104 contained in the tank 102. The fluid 104 is illustrated to have agitation 106.

The agitation 106 makes it extremely difficult to accurately measure the level of the fluid 104 in the tank 102. For example, if the linear FM radar 100 could measure just the peaks and the troughs an accurate measurement of the level of fluid 104 in the tank 102 could be made. The agitation 106 of the fluid 104, causes great difficulty in calculating the amount of fluid 104 in the tank 102.

Thus, the measured level of fluid 104 could be significantly different, than the actual level of the fluid 104.

The strongest signals are received from the peaks and troughs. The strong signals received from the peaks and troughs, as used in practicing the present invention, enhance or weight the results. The strong signals, as used in practicing the present invention, are not altered by Doppler characteristics. Particularly, the signals from the peaks and troughs have the least amount of error because the peaks and troughs have zero velocity at the time of impingement. The peaks and troughs are the points where the instantaneous velocity of the fluid in the direction of the radar equals zero. Thus, at the peaks and troughs, the fluid 104 is perpendicular to the microwave beam and sends back the strongest signal.

The distance is determined for a smooth surface from the following formula:

$$f_{diff} = \frac{2R}{c} \cdot \frac{B}{T} = f_{(distance)}$$

where
R = distance,
c = speed of light,
B = band width, and
T = sweep time.

The use of the formula is complicated because the average measurement is not appropriate. The average measurement is not appropriate because the signal would be erratic, i.e., jump around too much. Also, it is not possible to use a time domain averaging technique. A time domain averaging technique would not be appropriate because the amplitude of such an average would be equal to zero. The present invention utilizes a "spectral" averaging analysis to determine the appropriate distance. The spectral averaging analysis used in the present invention provides an optimum, natural result. The result achieved by the present invention results in inherently weighting the average toward the correct result.

Figure 2:
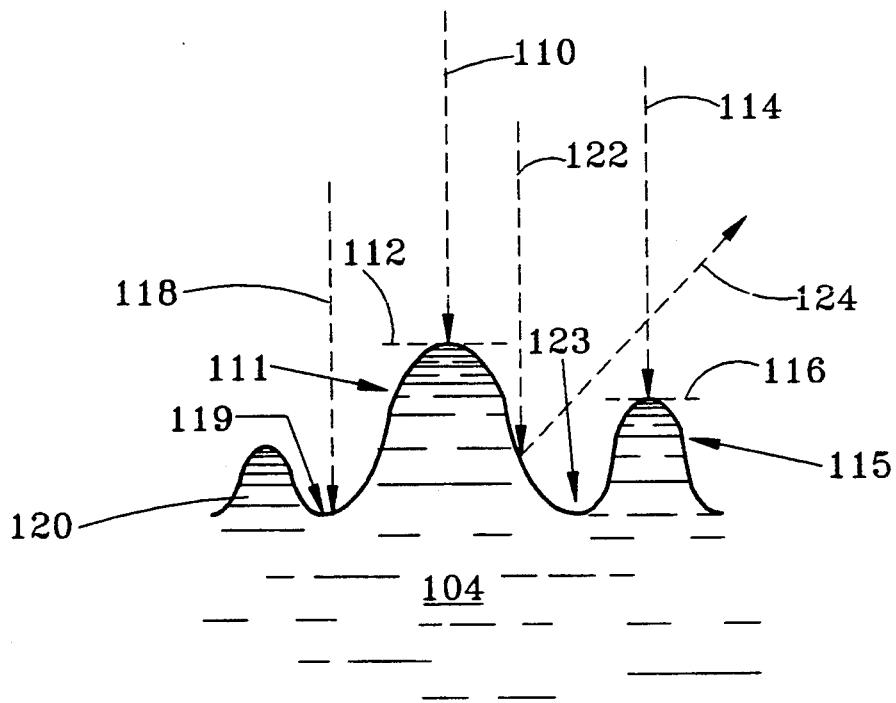
FIG. 2 is an exploded view of the cross-section along section 2—2 of FIG. 1 illustrating the relationship between the turbulent fluid and the reflected microwaves.

FIG. 2 illustrates a portion of the agitation 106 of the fluid 104 taken along the cross-section line 2—2 in FIG. 1. The microwave 110 is illustrated impinging upon the peak 111 at the normal 112 to the peak 111. Obviously, the reflected microwave will pass back along the same line of path 110 as the original microwave. Similarly, the microwave 114 is illustrated impinging upon the peak 115 at the normal 116 to the peak 115. The reflected microwave associated with microwave 114 will pass back along the same line. Further, the microwave 118 is illustrated impinging at the normal 120 to the lowest point in the trough 119. The reflected microwave corresponding to the microwave 118, will return along the same path as the original microwave 118. The microwaves do not necessarily follow straight lines. The drawings use straight lines for illustrative purposes only.

However, any microwave which impinges on any portion of the agitation 106 which is not at a normal, would be reflected away from its original path. Specifically, the microwave 122 is illustrated impinging upon the area between the peak 111 and the trough 123. The microwave 122, after impact, is deflected as microwave 124. The microwave 124 is a reflection normal to the fluid 104 between the peak 111 and the trough 123. As discussed above, the microwaves may not travel in straight lines and some will be received by the radar, but will be weaker. Thus, in a sequence of measurements, the higher amplitudes are derived from the peaks and troughs.

The understanding, and subsequent coordination, of the way the microwaves are impinging upon the agitated fluid 104 is important to achieve the unique result of the present invention.

Figure 3:
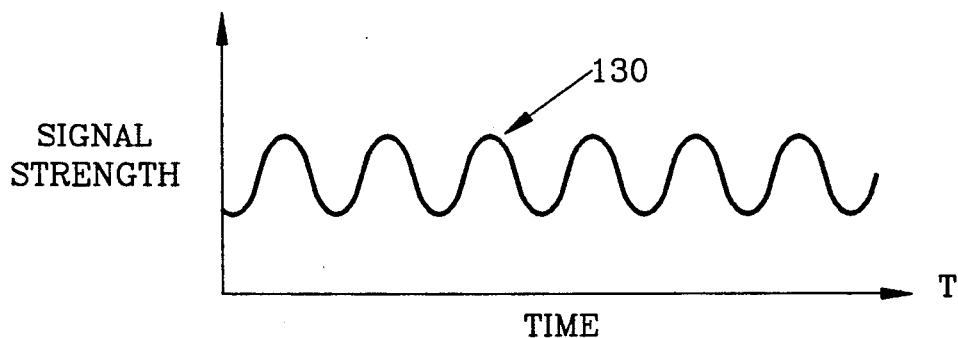
FIG. 3 is a graph illustrating the time domain signals received by the linear FM radar practicing the present invention.

FIG. 3 illustrates the low frequency sine waves received by the linear FM radar of the present invention. The signal 130 is a repetitive sine wave. Multiple signals are taken. The signals indicate the time domain signals associated with the returning microwaves. The time domain signals 130 are transformed into the frequency domain.

Figure 4:
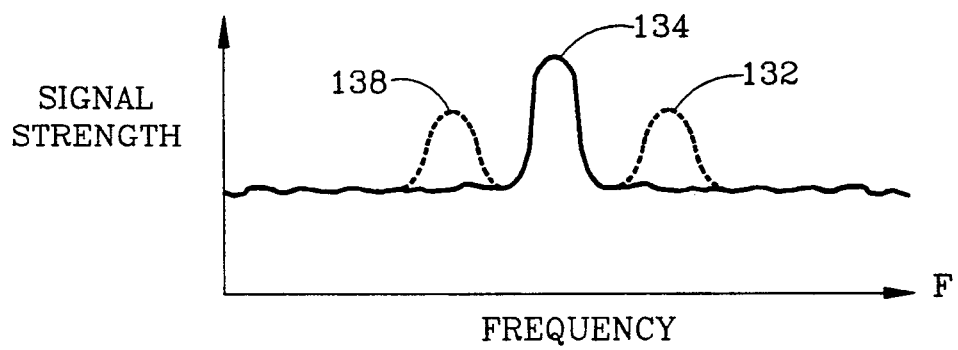
FIG. 4 is a graph of signal strength versus frequency illustrating the frequency domain signals utilized in the present invention.

FIG. 4 is a plot of signal strength versus frequency for signals in the frequency domain. The transformed signal 134 corresponds to the prior time domain signal 130. Also illustrated in FIG. 4 is the affect of multiple peaks 134, 136 and 138. The peaks 132 and 138 are skewed because of the Doppler frequence shift due to the roughness of the fluid surface. The peaks are present because of the Doppler effect providing a shift in the frequency. The Doppler frequency shift can be defined as:

$$F_{Dopp} = \frac{2V}{\lambda}$$

where:
V = velocity of the fluid motion in the direction of the radar, and
$\lambda$ = wave length.

When $F_{Dopp} = 0$, the signal is the most accurate. However, when $F_{Dopp} \neq 0$, the errors are exaggerated greatly. Due to the velocity of the fluid, the Doppler effect can be greater, and indeed even exceed, the actual error. For example, when $F_{Dopp} \neq 0$, a few inches of error in the fluid measurement can be recorded as a few feet of error by the radar.

Figure 5:
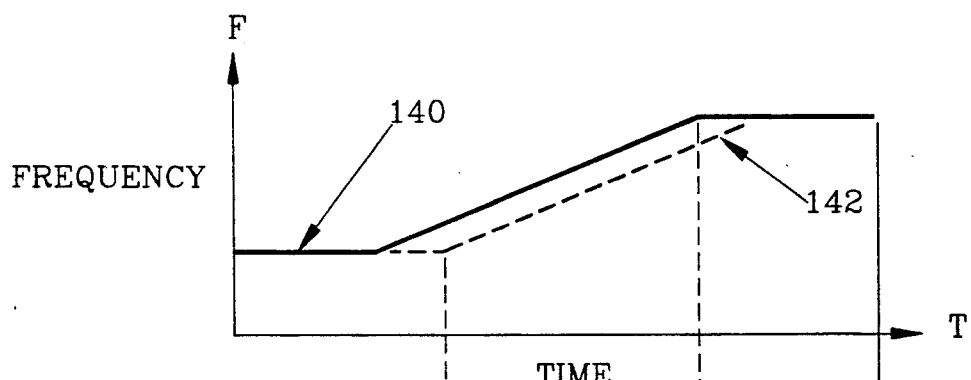
FIG. 5 is a graph of output frequency versus time illustrating the difference in frequency due to time delay.

FIG. 5 illustrates the difference in the output frequency due to the time delay, i.e., the output frequency of the microwave oscillator. The microwave oscillator is controlled in such a way that the output frequency changes linearly with time from one frequency to the next. During the sweep period, the microwave energy 140 is going out hitting the target and coming back 142. The frequency of the energy coming back will be at a slightly different frequency than is being transmitted, i.e., the dashed line 142. The distance between any vertical line through the slanted, dashed return signal 142 and the measured original signal 140 is a linear sweep. The linear sweep distance will be the same at every position that you draw such vertical lines. The frequency difference will be equal to the amount that you change the frequency, in other words the band width, divided by the time that it took to make that change in band width, i.e., B over T—the slope of the slanted line. Which is a well known technique used to generate microwave signals that are proportional to the distance to the target.

Figure 6:
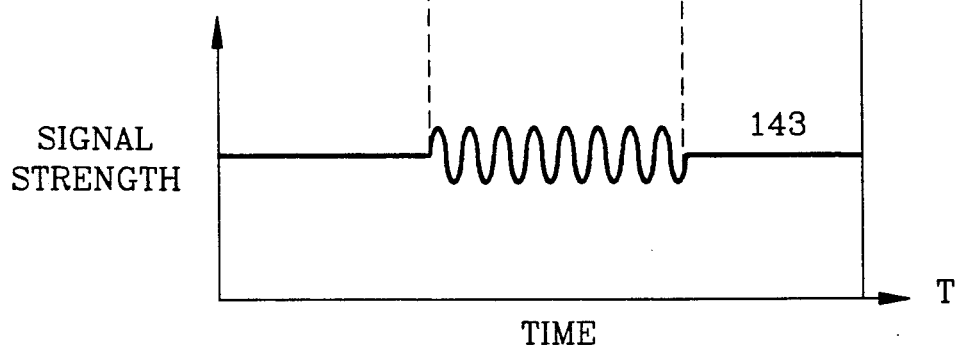
FIG. 6 is a graph of signal strength versus time illustrating the time domain output signal associated with FIG. 5.
Figure 7:
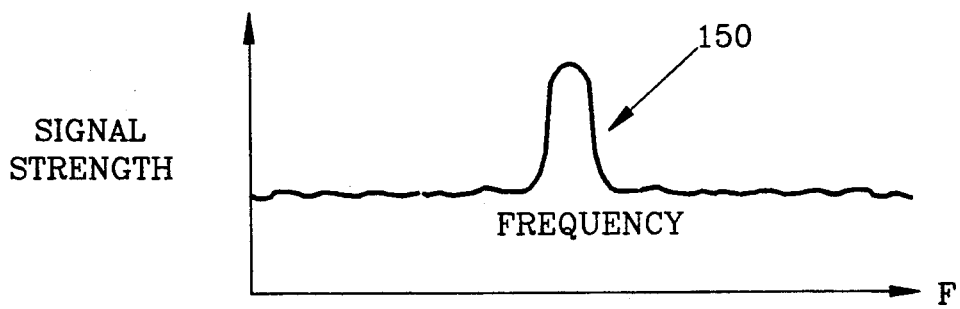
FIGS. 7, 8, 9 and 10 illustrate graphs of signal strength frequency which would be averaged together in practicing the present invention.
Figure 8:
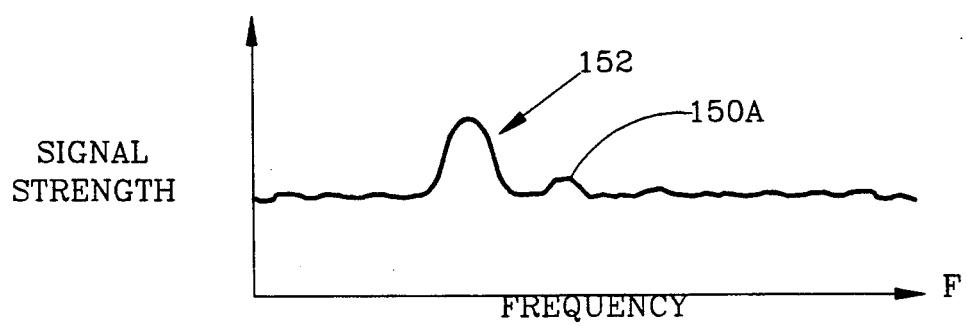
Figure 9:
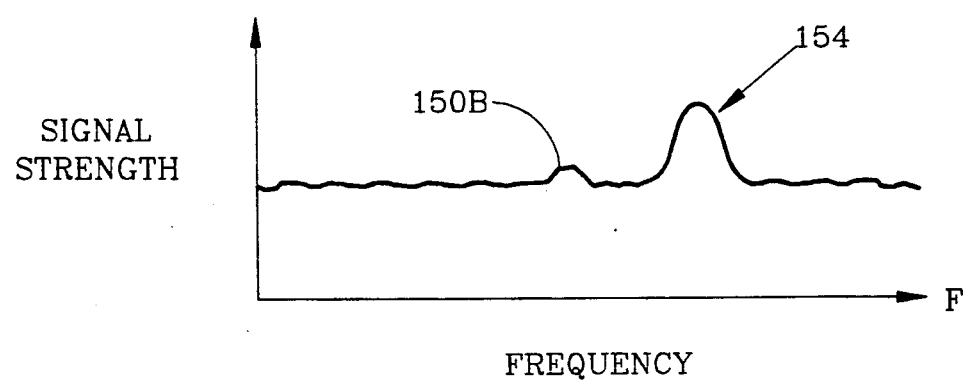
Figure 10:
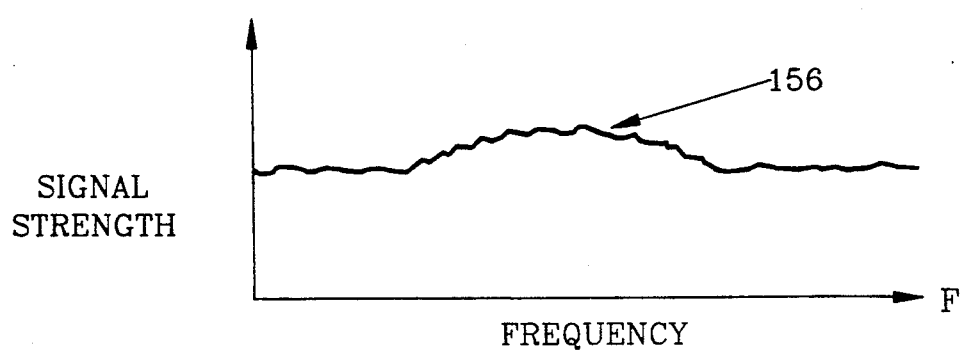

FIG. 6 is a graph of signal strength versus time illustrating the time domain output signal associated with FIG. 5. The time domain output signal 143 is illustrated and it would be flat until modulation occurs and then a sine wave during modulation, and then it goes flat again. The time domain output signal 143 is flat as long as the microwave transmitter is not being modulated. There is no sign wave being generated until modulation so that during the sweep, there is a sign wave and the frequency of that sign wave is the difference frequency. And thats the signal available to extract range information. Doppler effects move the dashed line closer to or farther from the solid line giving perceived distance error.

FIGS. 7, 8, 9, and 10 are plots of signal strength versus frequency for specific frequency domain signals received by the linear FM radar 100. In practicing the present invention, a plurality of return signals, for example, signals 150, 152, 154 and 156, are averaged together to achieve an average frequency. This average frequency is then used to calculate the appropriate distance as illustrated by the above equation defining the frequency for a smooth surface. In all FIGS. 7, 8, 9, and 10, the presence of the signals orthogonal to the tangent of the peaks/trough are prevelent as illustrated by the curves 150, 150A and 150B.

Figure 11:
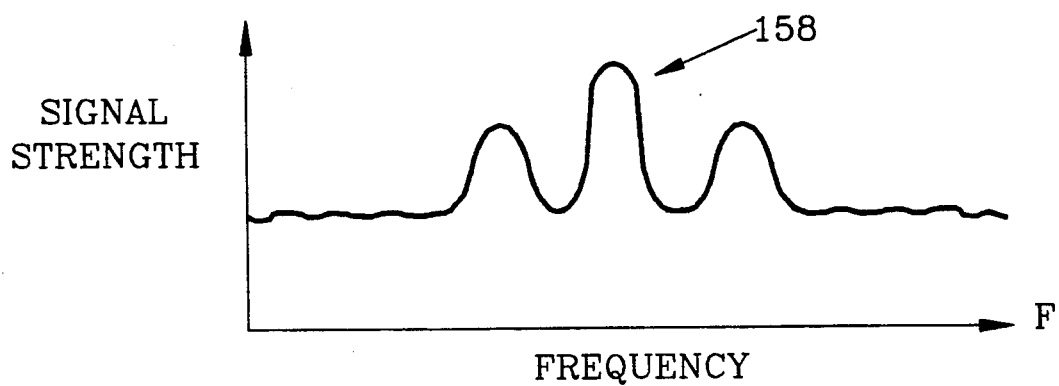
FIG. 11 is a graph of signal strength versus frequency illustrating the average value acquired in practicing the present invention.

FIG. 11 is a plot of signal strength versus frequency illustrating signal 158 which is the average of all the signals 150, 152, 154 and 156. The average signal 158 is used as a determination of the frequency associated with the specific, average distance. The true signal is strongest and is naturally selected in the distance computation. The present invention so elegantly solves the Doppler shift problem that only enough samples are required to capture at least one strong sample such that the strong sample dominates the mean or averaging process.

Figure 12:
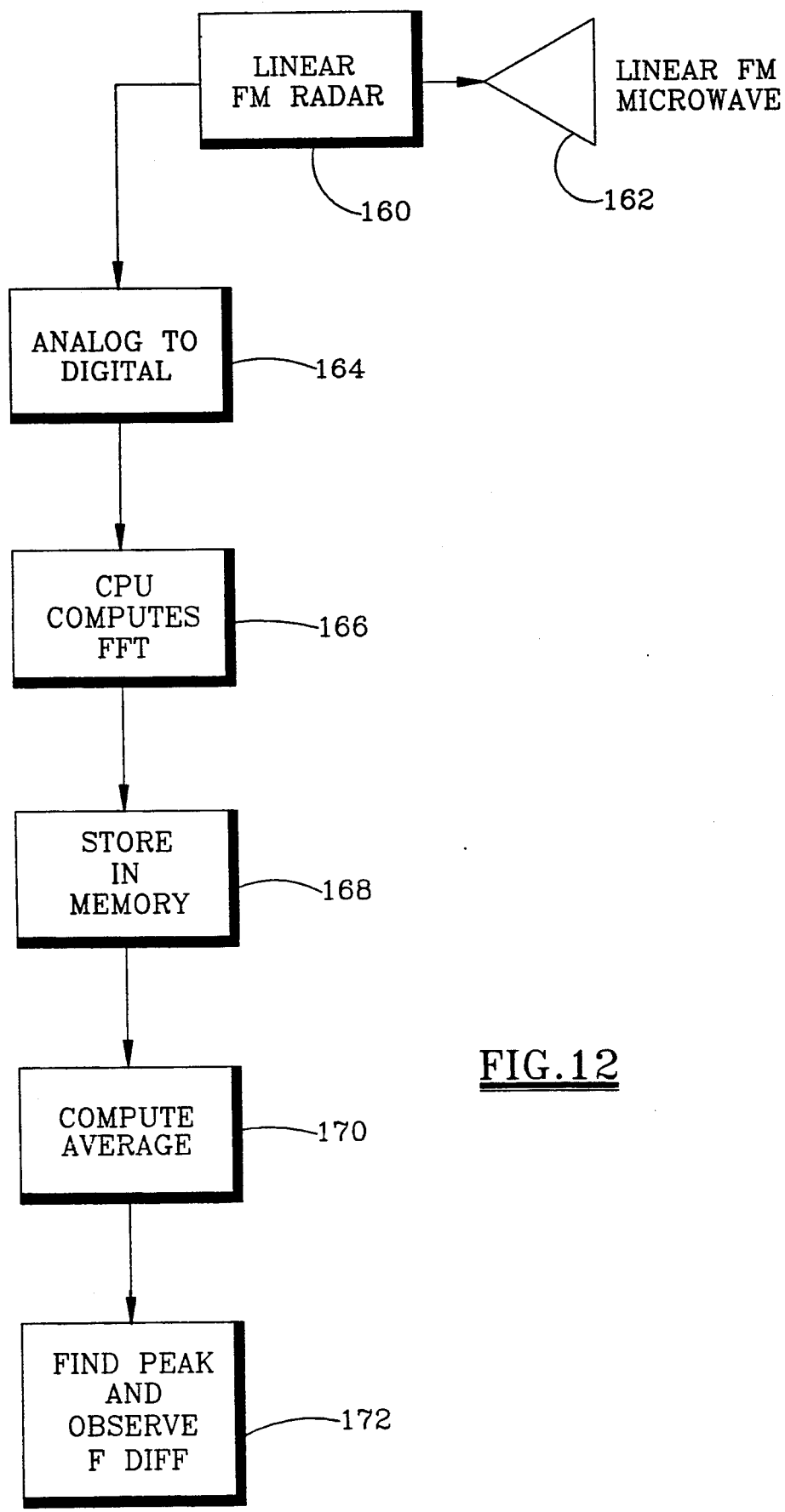
FIG. 12 is a schematic illustration of an apparatus for practicing the present invention.

FIG. 12 illustrates the apparatus of the present invention. The apparatus comprises a linear FM radar 160 and an antenna 162. The linear FM radar 160 creates the microwave signals which are transmitted through the antenna 162. The reflected signals are received by the antenna 162 and detected by the radar 160. The detected signals are converted by the analog-to-digital converter 164. A CPU 166 transforms the time domain signals received by the linear FM radar 160 into frequency domain signals. The frequency domain signals are stored in the memory 168. After a sufficient number of frequency domain signals are stored in the memory 168, a device 170 is used to compute the average. After the average is computed, a device 172 is used to find the peak and observe the frequency difference. The frequency difference is directly related to the distance as discussed above.

Additional advantages and modifications will readily occur to those skilled in the art. The invention in its broader aspects is therefore not limited to the specific details, representative apparatus and the illustrative examples shown and described herein. Accordingly, the departures may be made from the discussed details without departing from the spirit or scope of the disclosed general inventive concept.

What is claimed is:

1. A microwave apparatus for determining the ullage of agitated materials in a tank by spectral averaging comprising:
   (a) a frequency modulated continuous wave radar for transmitting a microwave signal into the agitated material and for receiving the reflected signals such that the strongest reflected signals are obtained from the tops and bottoms of the waves of the surface such that a time signal is generated,
   (b) means for transforming the time signal to the frequency domain thereby generating frequency components,
   (c) means for computing the average of each frequency component for generating an average spectrum,
   (d) means for repeating steps (a) through (c) for generating an averaged spectrum composed of a plurality of average spectrum which in turn are composed of frequency components,
   (e) means for determining the maximum peak associated with the averaged spectrum, and
   (f) means for calculating the mean distance level or ullage of the agitated material in the tank from the peak of the averaged spectrum.

2. A microwave apparatus for determining the ullage of agitated materials in a tank as defined in claim 1 further comprising means for placing the signals into processing form prior to transforming the signals from time domain to frequency domain.

3. A microwave apparatus for determining the ullage of agitated materials in a tank as defined in claim 2 wherein said means for placing the signals into processing form is an analog-to-digital converter.

4. A microwave apparatus for determining the ullage of agitated materials in a tank as defined in claim 1 further comprising means for transforming the time domain measurement to a frequency domain measurement by fast Fourier transform.

5. A method for ullage measurement of agitated materials by spectral averaging is provided comprising the steps of:
   (a) emitting a microwave signal into a tank containing an agitated fluid having a surface;
   (b) receiving multiple time domain measurements of the emitted microwave signal such that the strongest signals are obtained from the tops and bottoms of the waves of the surface;
   (c) converting each of the time domain signals to the frequency domain thereby generating frequency components;
   (d) summing the respective frequency components to obtain a total frequency domain spectrum; and
   (e) determining the peak of total frequency domain spectrum having the highest amplitude, which peak represents a frequency, and which frequency is directly related to the average distance to the surface of the agitated material in the tank.

6. A method for ullage measurement of agitated materials as defined in claim 5 wherein the step of transforming the time domain measurement to a frequency domain measurement comprises transforming by fast Fourier transform.

* * * * *